United States Patent [19]

Kohzai et al.

[11] 4,345,192
[45] Aug. 17, 1982

[54] CONTROL SYSTEM FOR STOPPING SPINDLE AT PREDETERMINED ROTATIONAL POSITION

[75] Inventors: Yoshinori Kohzai; Yoshiki Fujioka; Naoto Ota, all of Hino, Japan

[73] Assignee: Fujitsu Fanuc Limited, Tokyo, Japan

[21] Appl. No.: 190,660

[22] Filed: Sep. 25, 1980

[30] Foreign Application Priority Data

Oct. 9, 1979 [JP] Japan .................. 54-130154

[51] Int. Cl.³ .................. G05B 11/18
[52] U.S. Cl. .................. 318/592; 318/653; 364/474
[58] Field of Search .......... 318/592, 590, 561, 571, 318/653; 364/474, 475

[56] References Cited

U.S. PATENT DOCUMENTS

| 3,657,524 | 4/1972 | Bakke | 318/561 X |
| 4,206,392 | 6/1980 | Shimajiri et al. | 318/571 X |
| 4,207,504 | 6/1980 | Kawada et al. | 318/590 X |
| 4,288,849 | 9/1981 | Yoshida et al. | 364/474 |

Primary Examiner—B. Dobeck
Attorney, Agent, or Firm—Staas & Halsey

[57] ABSTRACT

A control system for stopping a spindle at a prescribed rotational position having a position control loop for driving a spindle so that a positional deviation between the present rotational position of a specified point on the spindle and a predetermined rotational position at which the specified point is to be stopped, is reduced to zero to stop the specified point on the spindle at the predetermined rotational position. Fine and coarse voltage signals are utilized for the final positioning process.

9 Claims, 15 Drawing Figures

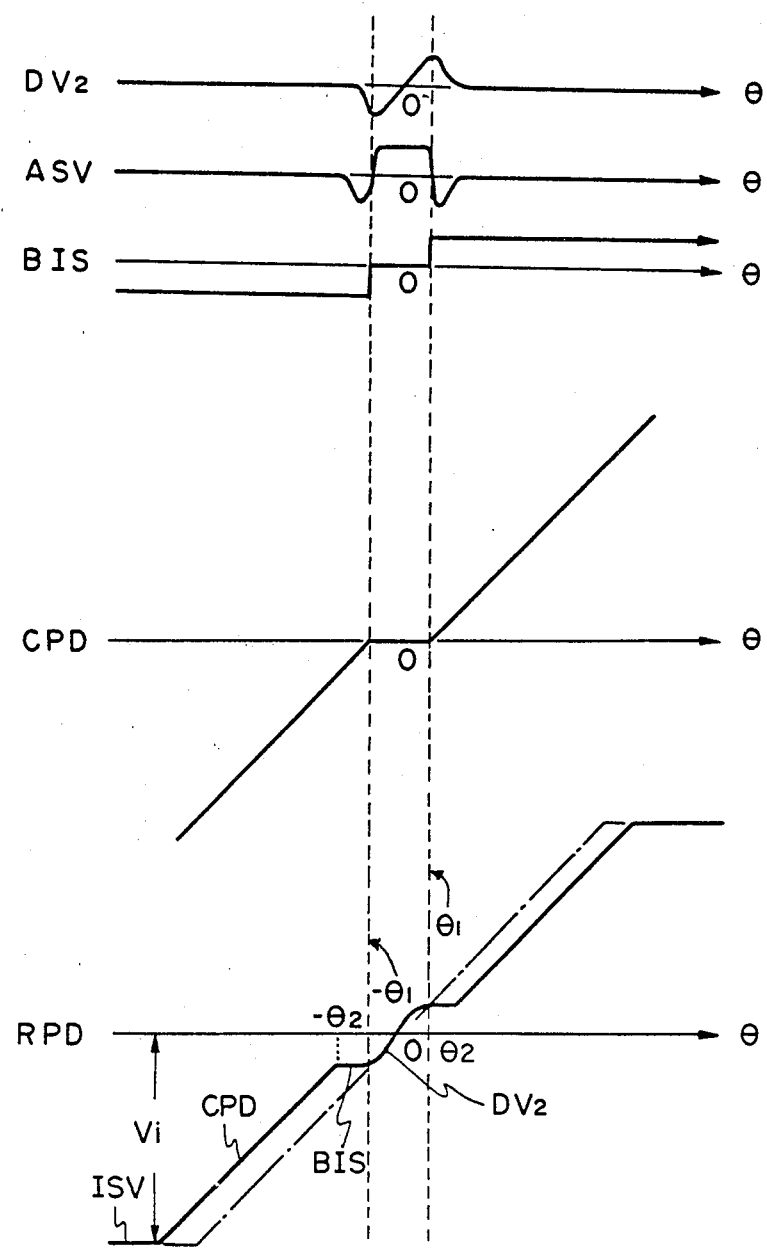

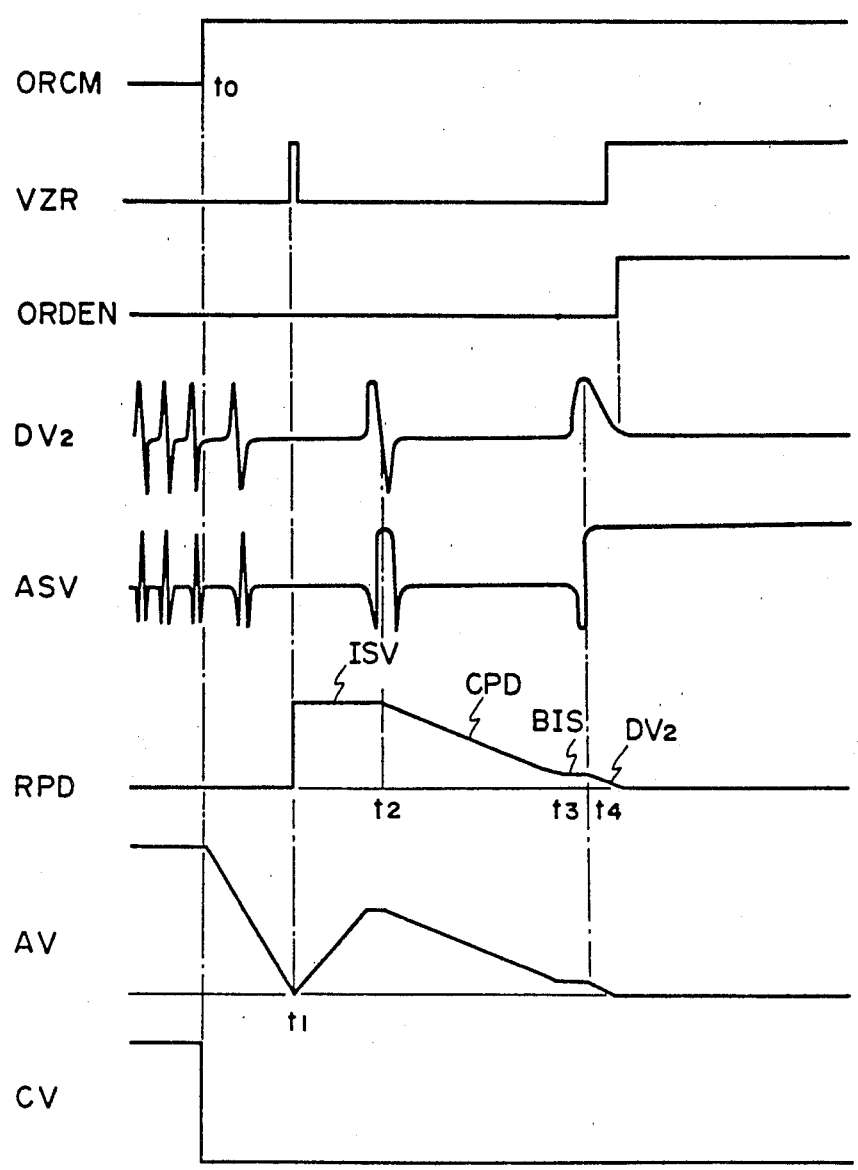

Fig 3(A)      Fig 3(B)
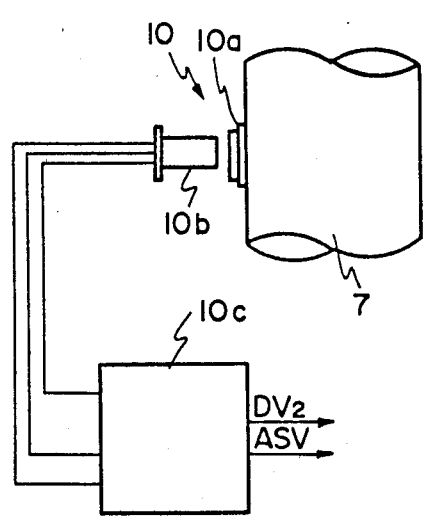
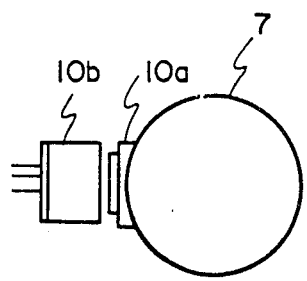
Fig 3(C)      Fig 3(D)
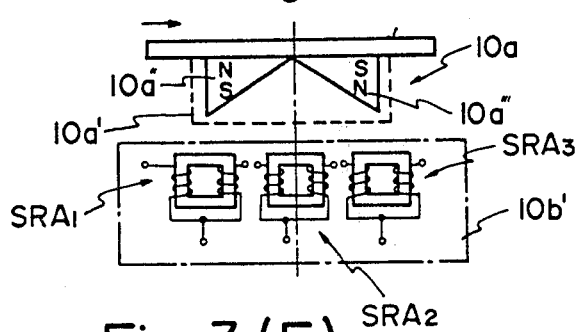
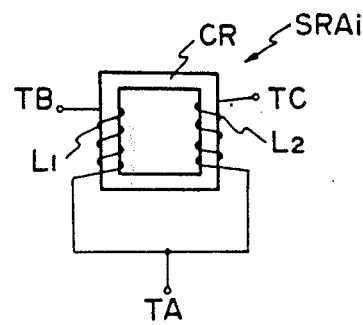
Fig 3(E)
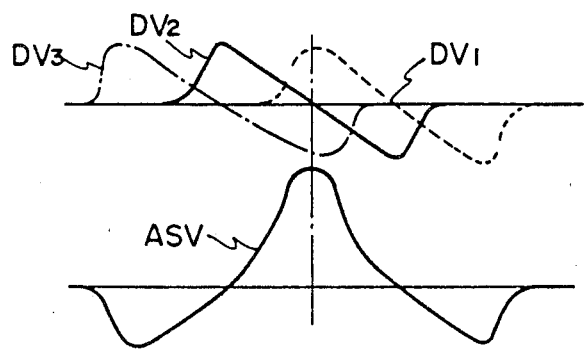

CONTROL SYSTEM FOR STOPPING SPINDLE AT PREDETERMINED ROTATIONAL POSITION

BACKGROUND OF THE INVENTION

This invention relates to a control system for stopping a spindle at a predetermined position, and more particularly to a control system which is adapted to stop a spindle firmly at a predetermined rotational position with a high accuracy.

Machine tools with automatic tool changers are well known in the art. These are machine tools that perform machining work automatically while various tools are also changed automatically. The tools carried on such machines are changed in the following manner. First, a magazine holding a number of tools is revolved to bring a vacant tool holding portion of the magazine into position directly above a spindle mechanism. The spindle mechanism, which is grasping an old tool to be exchanged for a new one, is then projected forward, after which the magazine positioned above the spindle mechanism is lowered to permit the old tool to be received and grasped by the vacant tool holding portion of the magazine. The spindle mechanism is then retracted so that the old tool separates from the spindle, thus transferring the old tool to the magazine. Next, the magazine is revolved to bring a desired new tool into position in front of the spindle, and the spindle mechanism is projected forward to receive and grasp the new tool. Finally the magazine is raised away from the spindle to complete the tool change operation.

It is required in the tool change mechanism of the foregoing type that a prescribed part of the spindle, such as a key member, be stopped accurately at the correct rotational position in order to permit the fitting portions of the spindle and tool to mate smoothly with each other. More specifically, a key is mounted on the spindle and a key way is formed in the tool in order to mate with the key. The smooth mating of the spindle and tool requires that the spindle be positioned and stopped to provide the correct alignment of key and key way. Meeting the above requirement necessitates a high spindle positioning accuracy of from ±0.1° to ±0.2° in terms of the angle of rotation of the spindle.

The conventional automatic tool change mechanisms are provided with photoelectric detectors or with limit switch mechanisms which detect the rotational position of the spindle key in order to facilitate the smooth mating of the spindle and tools. The arrangement is such that the spindle is brought to a stop at the prescribed position by the application of a mechanical brake which is actuated in response to a signal from the key position detecting means.

The foregoing apparatus not only fails to provide the desired positioning accuracy but has a stopping mechanism that experiences wear with long use since the mechanism relies upon mechanical pin or brake means or the like. Such wear, particularly of a brake shoe or pin, makes it progressively more difficult to stop the spindle at the prescribed position as time passes, and the result is that the automatic exchanging of tools cannot proceed smoothly. Avoiding this situation entails troublesome maintenance and inspection work.

Stopping the spindle accurately at the predetermined rotational position is important not only when changing tools but also when withdrawing a tool from a workpiece in a boring operation. It is also important when attaching a square workpiece to, or detaching it from, a spindle in a lathe or the like. It is important in the former case in order to avoid flawing the workpiece, and in the latter case because the mounting and demounting of the workpiece would be impossible without correct positioning of the spindle. As pointed out above, however, stopping the spindle accurately at the correct position is not possible with the conventional apparatus, so that operability and workability decline.

SUMMARY OF THE INVENTION

Accordingly, it is an object of the present invention to provide a control circuit for stopping a spindle at a predetermined rotational position, by which a spindle can always be stopped at a predetermined rotational position with a high accuracy, without the use of a mechanical brake or the like, through purely electrical means.

It is another object of the present invention to provide a control circuit for stopping a spindle at a predetermined rotational position, by which a spindle can be stopped at the predetermined rotational position in a short period of time without an overshoot and without the occurrence of hunting.

It is still another object of the present invention to provide a control circuit for stopping a spindle at a predetermined rotational position, wherein use can be made of a highly accurate proximity switch of the contactless type.

It is a further object of the present invention to provide a control circuit for stopping a spindle at a predetermined rotational position, wherein a spindle is stopped at a predetermined rotational position by employing a coarse position deviation voltage and a fine position deviation voltage which is obtained from a highly accurate proximity switch of the contactless type.

Other features and advantages of the invention will be apparent from the following description taken in conjunction with the accompanying drawings.

BRIEF DESCRIPTION OF THE DRAWINGS

FIGS. 2A and 2B are waveform diagrams associated with the block diagram of FIG. 1;

DESCRIPTION OF THE PREFERRED EMBODIMENT

Figure 1:
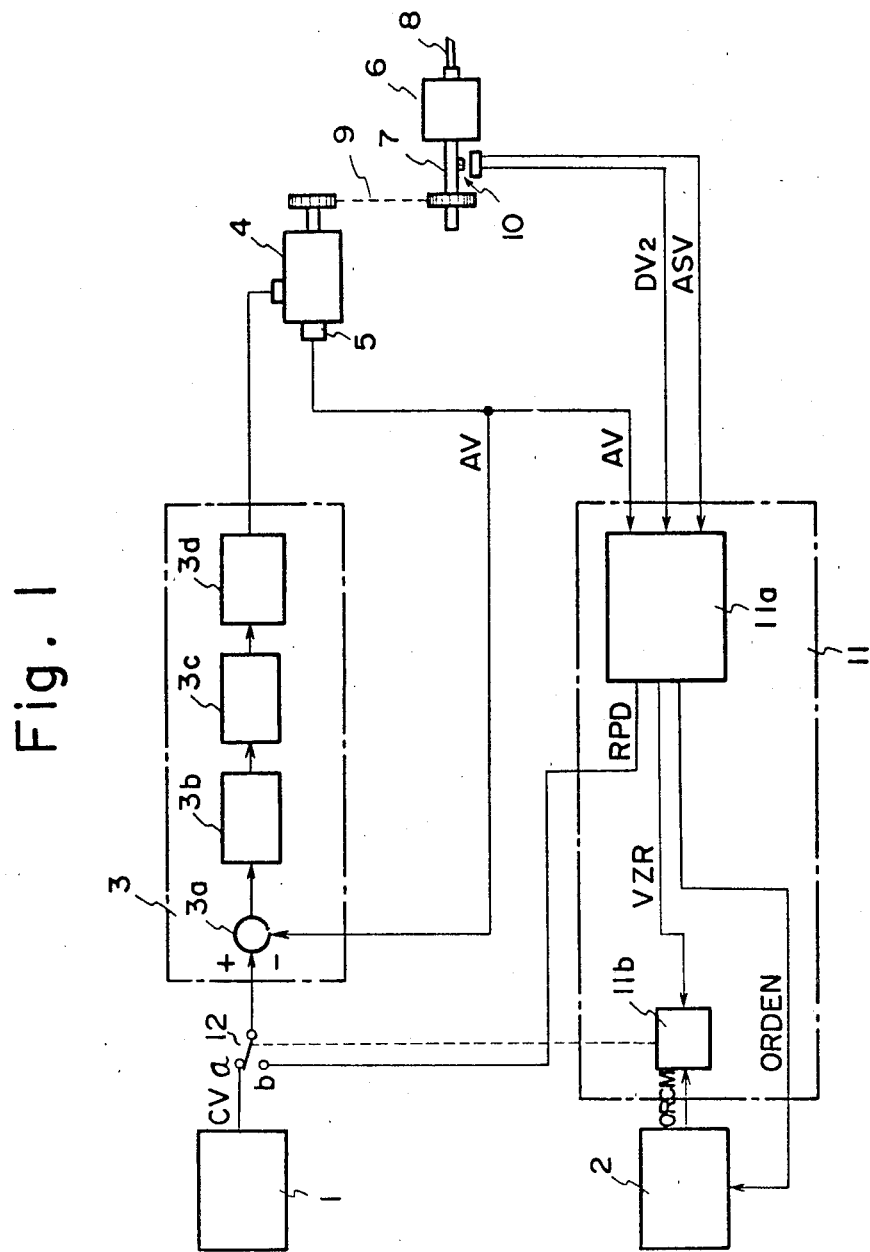
FIG. 1 is a circuit block diagram of a control system for stopping a spindle at a predetermined rotational position in accordance with the present invention.
Figure 3:
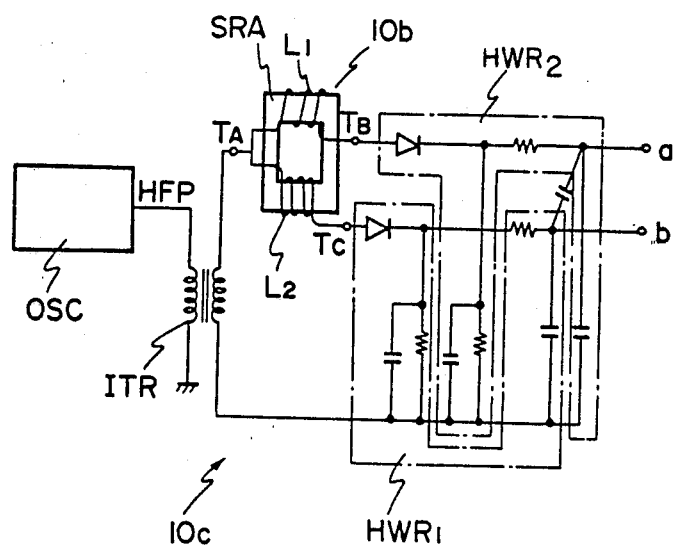
FIGS. 3A through 3F are views useful in describing a position detector, specifically a proximity switch.

Referring to FIG. 1, there are provided a speed command circuit 1 which produces a speed command signal CV, and an orientation command circuit 2 which produces an orientation command signal ORCM. A speed control circuit 3 includes an adder 3a, a phase compensating circuit 3b, a voltage-to-phase converter 3c, and a thyristor circuit 3d. The adder 3a is adapted to deliver a difference voltage (speed deviation) between the commanded speed CV and the actual speed AV during speed control, and to deliver a difference voltage between a position deviation signal RPD and the actual speed signal AV. The phase compensating circuit 3b subjects the output voltage of the adder 3a to a phase compensation by advancing or retarding its phase. The voltage-to-phase converter 3c controls the firing angle of each thyristor in the thyristor circuit 3d in accordance with the output voltage of the phase compensating circuit 3b. The thyristor circuit 3d operates in accordance with the controlled firing angles of its thyristors to vary the value of a voltage applied to a DC motor 4, thereby to regulate the speed at which the motor rotates. As the motor 4 rotates, a tachometer 5 generates a voltage in accordance with the motor speed. Numeral 6 denotes a spindle mechanism, 7 a spindle, 8 a tool and 9 a gear train (or timing belt) for transmitting the rotational motion of the DC motor 4 to the spindle 7. A proximity switch 10 serving as a position detector comprises a magnetic body 10a, a sensing portion 10b and an electric circuit 10c, as described in more detail with reference to FIG. 3.

The front and plan views of the position detector, namely FIGS. 3A and 3B, show the magnetic body 10a mounted on the spindle 7. The magnetic body 10a is mounted on the spindle 7 at an angular position corresponding to the specified point which is to be stopped at the predetermined rotational position. The magnetic body 10a, as shown in FIG. 3C, has magnets 10a'', 10a''' mounted in a case 10a' in such a manner that the intesity of the magnetic field changes from S to N in the direction of spindle rotation, i.e., in the direction of the arrow. The sensing portion 10b is mounted on a mechanically stationary portion so as to confront the magnetic body 10a, and includes three saturable reactors $SRA_1$, $SRA_2$, $SRA_3$ provided in a case 10b' and aligned in the direction of spindle rotation, as illustrated in FIG. 3C. Each of the saturable reactors $SRA_{i(i=1, 2, 3)}$ comprises coils $L_1$, $L_2$ wound on a core CR, as shown in FIG. 3D. The coils $L_1$, $L_2$ on each core are so wound as to have opposing polarities. The coils on each core share a common contact TA to which a high-frequency signal is applied, and signals which are in accordance with the position of the magnetic body 10a are obtained from the terminals TB and TC of respective coils.

Shown in FIG. 3E are voltage waveforms obtained from each of the saturable reactors $SRA_{i(i=1, 2, 3)}$ when the magnetic body 10a and sensing portion 10b have the positional relationship shown in FIG. 3C. Specifically, $DV_1$, $DV_2$, $DV_3$ denote the voltage waveforms across the terminals TB and TC of the saturable reactors $SRA_1$, $SRA_2$, $SRA_3$, respectively. Each of these waveforms has a value of zero volts when the center line of the corresponding saturable reactor $SRA_{i(i=1, 2, 3)}$ coincides with the center line of the magnetic body 10a. At such time the waveform is positive on one side of the zero value and negative on the other side. That is, the area under the waveform on one side of the zero value equals the area under the waveform on the other side of the zero value. The voltage waveform ASV is the sum of the voltages $DV_1$, $DV_3$, which, along with $DV_2$, will be referred to also as detection voltages hereinafter.

The electrical circuit 10c for one saturable reactor SRA is shown in detail in FIG. 3F. The circuit includes a pulse oscillator OSC for generating a 100 kHz high-frequency pulse signal HFP, an isolating transformer ITR, and half-wave rectifiers $HWR_1$, $HWR_2$. The saturable reactor SRA is excited by the high-frequency pulse signal HFP through the intermediary of the isolating transformer ITR. As a result, the output voltages $DV_{i(i=1, 2, 3)}$ shown in FIG. 3E will be obtained across the terminals a, b of the circuit in FIG. 3F for each saturable reactor, and these output voltages will be proportional to the external magnetic field $H_{ext}$ whose strength varies in accordance with the position of the magnetic body 10a.

Figure 4A:
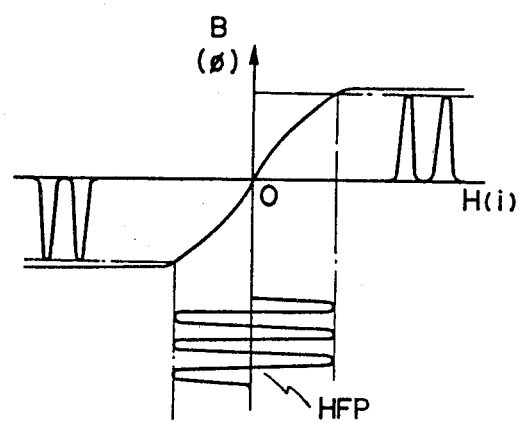
FIGS. 4A through 4D are views which are useful in describing the operation of the proximity switch.
Figure 4B:
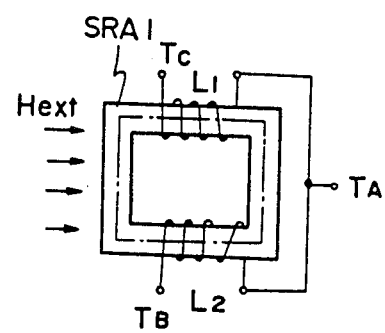
Figure 4C:
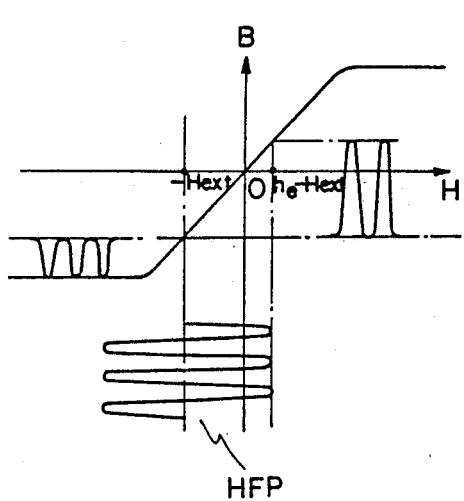
Figure 4D:
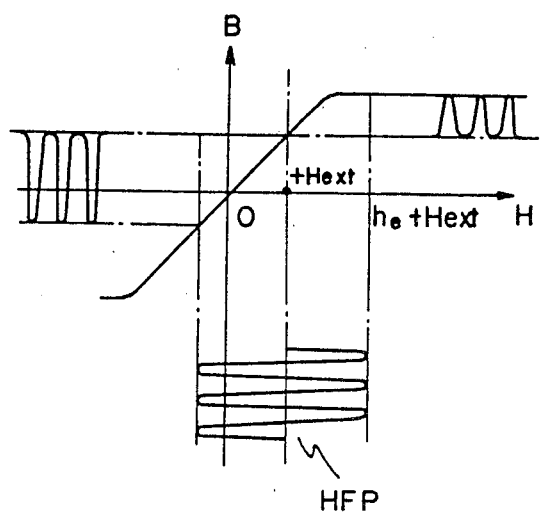

The action of a voltage waveform $DV_1$ obtained across the terminals a, b will now be described with reference to FIG. 4 in connection with the reactor $SRA_1$ on the left-hand side of FIG. 3C. When the magnetic body 10a is remote from the saturable reactor $SRA_1$ so that the external magnetic field acting upon the reactor $SRA_1$ has a value of zero, the high-frequency pulse signal HFP acts about the vertical zero line of the reactor B-H curve as shown in FIG. 4A. As a result, the number of lines of flux cutting the coils $L_1$, $L_2$ are equal, so that the output voltages from the terminals TB, TC are equal in amplitude but displaced in phase by 180°. It should be noted that since these voltages are rectified by the respective half-wave rectifiers $HWR_1$, $HWR_2$, the potentials at the terminals a, b are equal, so that the voltage across a, b is zero. Now, as the magnetic body 10a approaches the saturable reactor $SRA_1$, the external magnetic field $H_{ext}$ being generated by the magnetic body begins to act upon the reactor $SRA_1$. If we let $h_e$ denote the field generated by the high-frequency pulse signal HFP, a flux in accordance with $h_e - H_{ext}$ will cut the coil $L_1$, as shown in FIG. 4B, and a flux in accordance with $h_e + H_{ext}$ will cut the coil $L_2$. If this is expressed by a B-H curve, the high-frequency pulse signal HFP will act about the line $-H_{ext}$ as its center with respect to coil $L_1$, as shown in FIG. 4C, and about the line $+H_{ext}$ with respect to coil $L_2$, as depicted in FIG. 4D. Therefore the negatively directed flux which cuts the coil $L_1$ causes saturation of the core and exhibits a smaller amount of variation, as shown in FIG. 4C, whereas the negatively directed flux which crosses the coil $L_2$ does not cause saturation and exhibits a greater amount of variation, as shown in FIG. 4D. In view of the fact that the induced voltage e takes on the value $-N(d\phi/dt)$ (where N is the number of turns), the potential at the terminal b will become greater than the potential at terminal a, giving rise to a potential difference across the terminals. This potential will vary as shown by the curve $DV_1$ in FIG. 3E as the magnetic body 10a continues to rotate. This completes the description of the position detector 10.

Returning now to FIG. 1, an orientation control circuit denoted at numeral 11 includes a position deviation signal generating circuit 11a which produces a position deviation signal RPD of a voltage level in accordance with a positional deviation, as well as an orientation completion signal ORDEN, and a loop changeover circuit 11b for actuating a loop changeover switch 12 on the basis of an orientation command from the orientation command circuit 2. The operation of the position deviation signal generating circuit 11a will now be described in connection with the waveforms of FIG. 2A. The actual structure of the circuit will be described later.

The position deviation signal generating circuit 11a receives, from the position detector 10, the detection voltage $DV_2$ (which is utilized as a fine, as opposed to a coarse, position deviation signal when the spindle is in the vicinity of the predetermined rotational position) corresponding to the output of the saturable reactor $SRA_2$ which is the centrally disposed one in FIG. 3C, and an approach signal ASV which is obtained by adding the detection voltages $DV_1$, $DV_3$ corresponding to the outputs of the saturable reactors $SRA_1$, $SRA_3$, respectively, and which indicates that the spindle has entered an area in the vicinity of the predetermined rotational position. The signal AV indicative of the actual speed of the motor 4 also enters the circuit $11a$ from the tachometer 5 and is integrated within the circuit. The result of the integration is subtracted from an initially set voltage ISV, which will be described below, and is thereby converted into a coarse position deviation signal CPD. The position deviation signal generating circuit $11a$ generates the constant, initially set voltage ISV, and a bias signal BIS, which are illustrated in FIG. 2A. The voltage value Vi of the voltage ISV is set so as to be equal to a position deviation voltage which corresponds to one revolution (360°) of the spindle.

The position deviation signal generating circuit $11a$ outputs the initially set voltage ISV as the position deviation signal RPD, from the time $t_1$, at which the orientation command signal ORCM is generated, until the time $t_2$, when the spindle first reaches the predetermined rotational position. Thereafter, as the spindle continues to rotate and the magnetic body $10a$ (the predetermined part of the spindle) approaches the predetermined rotational position for the second time, the coarse position deviation signal CPD is outputted as the position deviation signal RPD, until the magnetic body $10a$ reaches the area, (defined between $-\theta_1$ and $+\theta_1$, in the vicinity of the predetermined rotational position, that is, until it arrives at the position denoted by $-\theta_2$ in FIG. 2(A). Furthermore, the bias signal BIS is also produced until the abovesaid area is reached. The fine position deviation signal $DV_2$, on the other hand, is generated after the magnetic body $10a$ has reached and then entered the area in the vicinity of the prescribed position. The result of these operations is the position deviation signal RPD which is shown in FIG. 2(A). It should be noted that the bias signal waveform BIS can be removed from the signal RPD by setting $\theta_2$ equal to $\theta_1$.

Reference will now be had to FIG. 2B to describe the operation of the control circuit shown in FIG. 1.

During rotation of the motor the changeover switch 12 is connected to the a side in FIG. 1, thereby forming a speed control loop. More specifically, the adder $3a$ receives the speed command signal CV from the speed command circuit 1 and the average speed signal AV from the tachometer, 5, and responds by delivering a speed deviation voltage. the voltage-to-phase converter $3c$ controls the firing angle of the thyristors in the thyristor circuit $3d$ in accordance with the speed deviation voltage, the thyristor circuit $3d$ thereby regulating the voltage applied to the DC motor 4. As a result, the actual speed AV of the DC motor 4 is regulated to bring it into coincidence with the command speed CV. Thereafter the speed control loop regulates the speed of the motor 4 so as to hold the speed deviation to zero, thereby allowing the motor, namely the spindle, to rotate at approximately the command speed during machining.

When the machining work is completed, a control device such as a numerical control unit instructs the orientation command circuit 2 to apply the orientation command signal ORCM to the loop changeover circuit $11b$ at time $t_0$. The speed command signal CV also is removed at this time, dropping to zero in FIG. 2B. The actual speed AV of the motor and spindle consequently decreases and reaches zero at time $t_1$. When this occurs, a pulse signal VZR indicative of zero speed is generated within the position deviation signal generating circuit $11a$ and causes the loop changeover circuit $11b$ to changeover the switch 12 to the b side, so that circuit operation now changes from speed control to position control. In response to the pulse VZR the position deviation signal generating circuit $11a$ first produces the initially set voltage ISV as a position deviation signal. In response to this signal the spindle begins to rotate again so that the signal AV indicative of the actual speed rises to assume the value Vi. As the magnetic body $10a$ on the spindle continues to rotate and reaches the predetermined rotational position for the first time (time $t_2$), the position deviation signal generating circuit $11a$ generates the coarse position deviation signal CPD as the position deviation signal RPD. As the spindle continues to rotate and the magnetic body $10a$ approaches the area in the vicinity of the predetermined rotational position (time $t_3$), the position deviation signal generating circuit $11a$ produces the bias signal BIS as the position deviation signal RPD. Then, when the magnetic body arrives at the abovesaid area in the environs of the predetermined rotational position (time $t_4$), the circuit $11a$ generates the fine position deviation signal $DV_2$. When the signal $DV_2$ has decreased to zero, namely when the magnetic body $10a$ on the predetermined part of the spindle is directly confronting the central saturable reactor $SAR_2$, positioning control of the spindle is complete.

Figure 5:
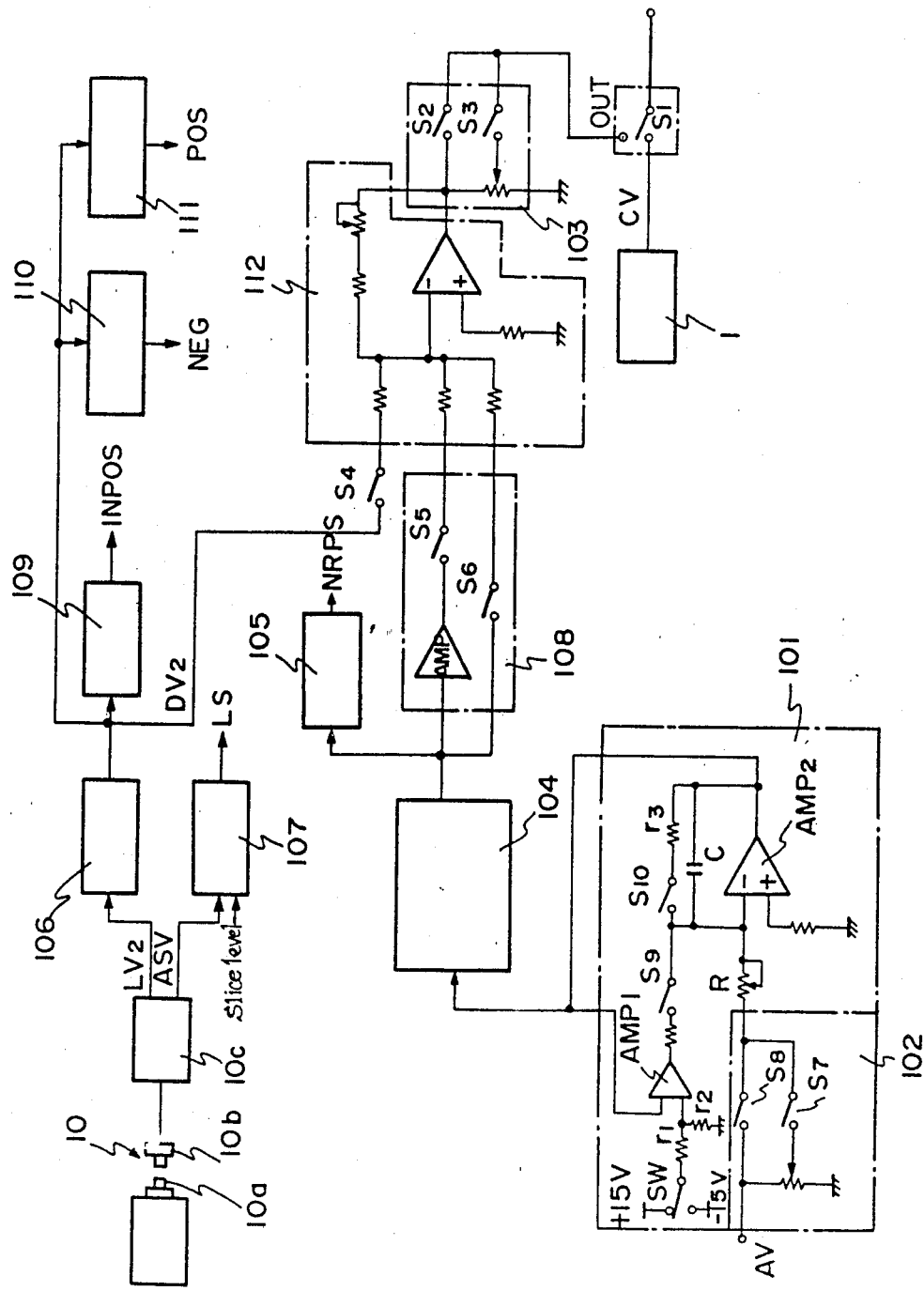
FIG. 5 is a detailed circuit diagram of a position deviation signal generating circuit.
Figure 6:
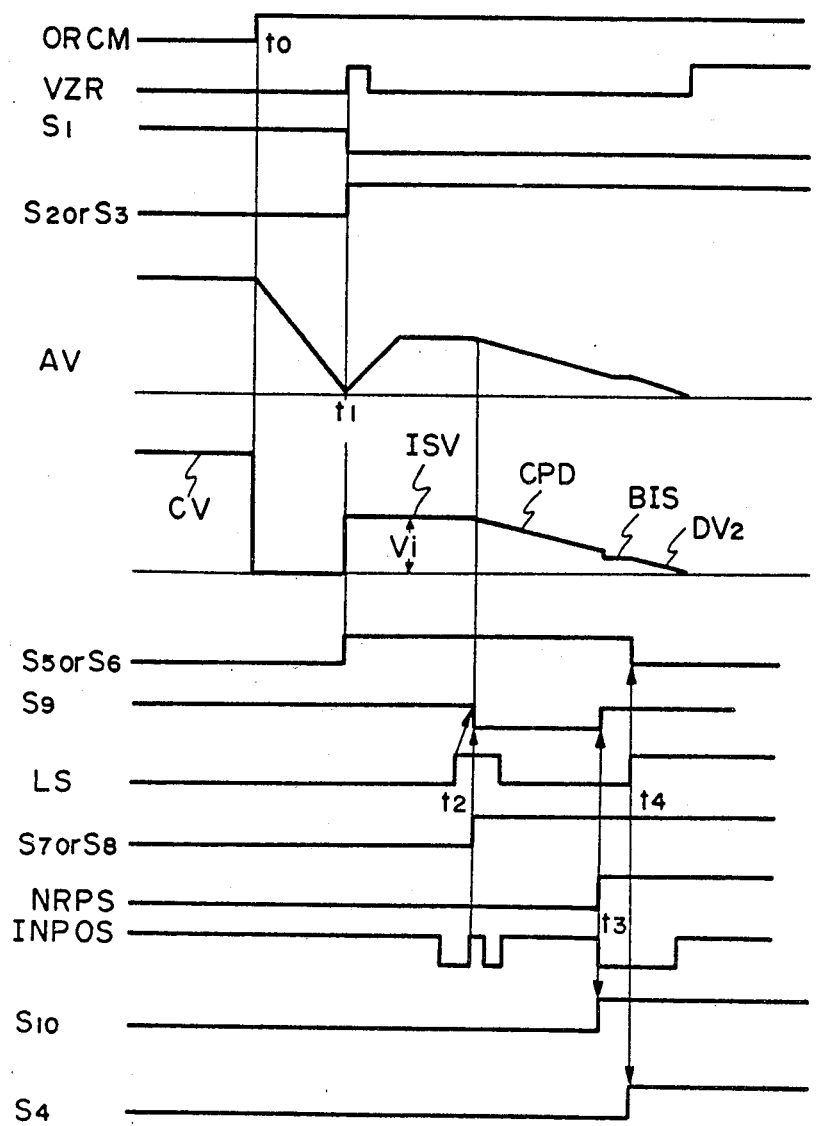
FIG. 6 is a timing chart of signals associated with the circuit of FIG. 5.

The structure of the position deviation signal generating circuit $11a$ is shown in FIG. 5, and the associated timing chart is shown in FIG. 6. Portions in FIG. 5 identical with those of FIG. 1 are denoted by the same reference numerals.

In FIG. 5, a circuit 101 is provided to form the initially set voltage ISV and the bias signal BIS, to integrate the actual voltage signal AV, and to substract the result of the integration from the initially set voltage ISV. Specifically, a changeover switch SW is switched over to either a +15 volt side or a −15 volt side in accordance with the direction of spindle rotation. If the spindle is rotating in the forward direction, the connection is to the −15 volt side. Assume that the changeover switch SW is switched to the −15 volt side at time $t_1$ in FIG. 6. The voltage is divided by resistors $r_1$, $r_2$ and charges a capacitor C through an amplifier $AMP_1$ and a switch $S_9$. The voltage charged in the capacitor becomes the value Vi of the initially set voltage ISV. If the actual speed signal AV enters the circuit 101 through a switch $S_8$ or a switch $S_7$ after the switch $S_9$ has been opened (time $t_2$), the capacitor C discharges at the time constant RC since the voltage value of the actual speed signal AV is lower than Vi, and the coarse position deviation signal CPD, obtained by subtracting the integrated actual speed signal AV from the initially set voltage ISV, appears at the output terminal of an amplifier $AMP_2$ (the amplifier $AMP_2$, the resistor R and the capacitor C forming an integration circuit). If the switches $S_9$, $S_{10}$ are both closed after the signal CPD has reached a predetermined voltage (time $t_3$), the circuit 101 acts as an amplifier, and the bias signal BIS of a predetermined level is obtained at the output terminals of the amplifier $AMP_2$. In other words, in accordance with the particular combination and timing of the opening and closing of the switches $S_7$ through $S_{10}$, first the initially set voltage ISV, then the coarse position deviation signal CPD, and finally the bias signal BIS is generated as the output of $AMP_2$.

Numerals 102, 103 denote changeover circuits for switching gain in accordance with gear ratio. These circuits increase the gain of the position control loop when the gears between the DC motor 4 and spindle 7 are set low (reduction ratio high), and reduce the gain when the gears are set high (reduction ratio low), that is, to reduce the gain compared to the gain for the high reduction gear ratio. More specifically, when the gear reduction ratio is high, switches $S_7$ and $S_2$ are closed and switches $S_8$ and $S_3$ opened to raise the gain, and when the gear reduction ratio is low, switches $S_8$ and $S_3$ are closed and switches $S_7$ and $S_2$ opened to lower the gain. This eliminates spindle hunting and overshoot when stopping the spindle at the prescribed position, and permits the spindle stopping operation to be completed quickly regardless of the size of the reduction ratio.

Numeral 104 is a well-known absolute value circuit which takes the absolute value of the output from circuit 101. A comparator 105 detects whether or not the coarse position deviation signal CPD has fallen below a predetermined level $V_0$, and produces a signal NRPS which indicates that the predetermined part of the spindle (the magnetic body 10a) is near the vicinity of the prescribed stopping position. The signal NRPS closes the switches $S_9$, $S_{10}$. A gain adjustment circuit 106 adjusts the gain in accordance with the gap between the magnetic body 10a and the sensing portion 10b and produces the detection signal $DV_2$ (the fine position deviation voltage) having a prescribed slope. A slicer circuit 107 slices the approach signal ASV (FIG. 2A) at a predetermined level and produces a signal LS which indicates that the magnetic body 10a has reached the area in the vicinity of the predetermined rotational position of the spindle. The signal LS opens the switches $S_5$, $S_6$ and closes switch $S_4$ (time $t_4$). As a result, the fine position deviation signal $DV_2$ is delivered as the position deviation signal RPD.

A forward-reverse changeover circuit 108 has its switch $S_5$ closed when the spindle is controlled by rotating it in the forward direction, and its switch $S_6$ closed when the spindle is rotated in the reverse direction. An "in-position" signal generating circuit 109, comprising a comparator, monitors the fine position deviation signal $DV_2$ and generates the in-position signal INPOS when the spindle is within range of the predetermined rotational position. The signal INPOS is generated, and thereafter a signal indicating completion of the orientation operation sent to the numerical control unit. Comparators 110, 111 monitor the fine position deviation signal $DV_2$ and produce signals NEG, POS upon detecting whether the spindle is approaching the prescribed position while rotating in the reverse direction (signal NEG at logical "1") or while rotating in the forward direction (signal (POS at logical "1"), respectively. Switch $S_5$ will close in response to the signal POS, and switch $S_6$ in response to signal NEG. A waveform synthesizing circuit 112 delivers either the fine position deviation signal or the coarse position deviation signal in accordance with the open or closed states of the switches $S_4$, $S_5$ or $S_6$.

In summary, if the orientation command signal ORCM goes to logic "1" at time $t_0$, the command speed signal CV drops to zero volts, so that the actual speed decreases, the actual speed signal AV dropping to zero volts at time $t_1$. At this time the zero speed signal VZR goes to logic "1", switch $S_1$ opens, one of the switches $S_2$ or $S_3$ closes in accordance with the low/high setting of the gears, and one of the switches $S_5$ or $S_6$ closes in accordance with the direction, either forward or reverse, of spindle rotation. This forms a position control loop whose output terminal OUT delivers the initially set voltage ISV. It should be noted that switch $S_9$ is closed and that switches $S_7$, $S_8$ and $S_{10}$ are open.

In response to the voltage ISV, the motor begins rotating again so that the spindle is rotated and reaches the predetermined rotational position the first time (i.e., the signal LS is a "1", and the in-position signal INPOS is a "1"). Hence, at time $t_2$, switch $S_9$ is opened and one of the switches $S_7$, $S_8$ is closed in accordance with the low/high setting of the gears. Therefore the coarse position deviation signal CPD is obtained from the output terminal OUT. Thereafter, as the actual speed AV and the positional deviation decrease and the spindle approaches the area in the vicinity of the predetermined rotational position for the second time (time $t_3$), the comparator 105 issues the signal NRPS (logical "1"), whereby the switches $S_9$ and $S_{10}$ are closed. As a result, the bias signal BIS of the prescribed level is delivered to the output terminal OUT. As the spindle continues to rotate at a slower speed and it reaches the area in the vicinity of the predetermined rotational position (time $t_4$), the signal LS goes to the "1" level, switches $S_5$, and $S_6$ and opened, and switch $S_4$ is closed. Hence, the fine position deviation signal $DV_2$ is delivered to the output terminal OUT.

In accordance with the present invention as described above, a spindle can be stopped at a predetermined rotational position with a high accuracy without relying upon contacting parts such as a mechanical brake. A highly accurate proximity switch is provided and adapted to produce a fine position deviation signal when a specified point on the spindle has reached the vicinity of the predetermined rotational position, whereby an extremely high accuracy on the order of from ±0.03° to ±0.05° can be obtained, as confirmed by measurements. Moreover, integrating the output voltage obtained from the tachometer provides a coarse position deviation signal, allowing a position control loop to be formed without the use of position sensors other than the proximity switch. The result is a reduction in cost. Since the arrangement is such that the gain of the position control system can be switched in accordance with the reduction ratio of the gears, the gain can be set appropriately to preclude hunting and overshoot, and to shorten the time required for positioning.

Although the invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:
1. A control system for stopping a spindle at a predetermined rotational position, which comprises:
 a position control loop for driving the spindle, for reducing to zero a positional deviation between the present rotational position of a specified point on the spindle and the predetermined rotational position, and for stopping the spindle at the specified point on the spindle at the predetermined rotational position, comprising:
 a sensor operatively connected to the spindle and to the position control loop, for producing a predetermined voltage signal level, in response to the specified point on the spindle being at the predetermined rotational position, for producing positive or negative voltage signals with respect to said predetermined voltage signal level in response to the specified point on the spindle being to the left or right of the vicinity of the predetermined rotational position, and for producing a fine position deviation voltage varying about said predetermined voltage signal level;

coarse positioning means for generating a coarse position deviation voltage in accordance with the positional deviation between the present rotational position of the specified point on the spindle and the predetermined rotational position; and position deviation signal generating means for selectively providing one of the coarse position deviation voltage and the fine position deviation voltage as, a position deviation signal, in accordance with the specified point on the spindle being outside the vicinity of the predetermined rotational position or the specified point on the spindle being in the vicinity of the predetermined rotational position, respectively;

wherein the position control loop drives the spindle in accordance with the coarse position deviation voltage until the specified point on the spindle reaches the vicinity of the predetermined rotational position, and then drives the spindle such that the fine position deviation voltage is reduced to zero after the specified point on the spindle has reached the area in the vicinity of the predetermined rotational position, thereby stopping the specified point at the predetermined rotational position.

2. The control system according to claim 1, further comprising position detecting means for detecting that the specified point on the spindle has reached the vicinity of the predetermined rotational position.

3. The control system according to claim 1, wherein the spindle has an actual speed, and the coarse positioning means comprises:

means for generating the coarse position deviation voltage responsive to the subtraction of the integrated value of the actual spindle speed from a position deviation voltage corresponding to a positional deviation equivalent to one spindle revolution.

4. The control system according to claim 2, wherein the spindle has an actual speed, and detection means are provided for detecting that the specified point on the spindle has approached the area in the vicinity of the predetermined rotational position, and in which the coarse positioning means provides as the coarse position deviation voltage until the specified point of the spindle reaches the vicinity of the predetermined rotational position, a voltage responsive to the subtraction of the integrated value of the actual spindle speed from a position deviation voltage corresponding to a positional deviation equivalent to one spindle revolution;

and thereafter provides as the coarse position deviation voltage, a voltage having constant level.

5. The control system according to claim 2, in which the sensor comprises:

a magnetic body mounted on the spindle;

a sensing circuit mounted on a mechanically stationary portion opposite said magnetic body, said sensor being arranged such that the direction of the magnetic field from said magnetic body changes from S to N in the direction of spindle rotation, said sensing circuit including:

a saturable reactor;

two coils oppositely wound on saturable reactor, and;

a command terminal operatively connected to one end of each of said coils, for receiving a high-frequency signal, the received high-frequency signal produces the fine deviation voltage across the remaining ends of said coils.

6. A control system according to claim 1 or claim 2, in which the position control loop has a variable gain and the driving means comprises:

gears having a variable gear ratio operatively connected to the spindle;

a DC motor operatively connected to the gears;

gain changeover means for changing the gain of the position control loop in accordance with the gear ratio.

7. The control system according to claim 2, further comprising three of said sensing circuits aligned in a row in the rotational direction of the spindle, the central sensing circuit of the three providing an output voltage corresponding to the fine position deviation voltage, and in which the position detecting means detects that the specified point of the spindle has reached the vicinity of the predetermined rotational position by means comprising an adder for adding the predetermined voltage signal level of the sensing circuits on either side of the central sensing circuit;

and a comparator operatively connected to the adder and to the reference means, for receiving a predetermined reference voltage, and for comparing the output voltage from the adder with the predetermined reference voltage level.

8. The control system according to claim 3 or claim 4, in which the coarse positioning means comprises a tachometer operatively connected to the spindle, for generating a voltage in accordance with the actual speed of the spindle, and an integration circuit operatively connected to the tachometer, for integrating the output voltage of the tachometer.

9. The control system according to claim 1 or claim 2, operatively connected to receive a command speed and an orientation signal, said system further comprising:

a speed control loop for controlling the speed of the spindle and for bringing the actual speed thereof into coincidence with the command speed;

speed detecting means for detecting that the actual speed of the spindle has reached a prescribed value, wherein is switched from the speed control loop to the position control loop when the actual speed of the spindle has reached a predetermined value due to a reduction in spindle speed in response to an orientation command signal for stopping the spindle at the predetermined rotational position.

* * * * *

UNITED STATES PATENT AND TRADEMARK OFFICE
CERTIFICATE OF CORRECTION

PATENT NO. : 4,345,192

DATED : August 17, 1982

INVENTOR(S) : Kohzai et al.

It is certified that error appears in the above—identified patent and that said Letters Patent is hereby corrected as shown below:

Col. 6, line 3, after "11a" insert --,--;

line 22, "environs" should be --vicinity--.

Col. 8, line 25, delete "," (first occurrence);

line 25, "and" (first occurrence) should be --are--.

Signed and Sealed this

First Day of March 1983

[SEAL]

Attest:

GERALD J. MOSSINGHOFF

Attesting Officer     Commissioner of Patents and Trademarks